United States Patent [19]

Bethshears et al.

[11] Patent Number: 5,415,862

[45] Date of Patent: May 16, 1995

[54] EFFERVESCENT LIQUID FISH ATTRACTANT COMPOSITION WITH AUDIBLE, VISUAL, SCENT AND TASTE ENHANCEMENTS AND METHOD OF MANUFACTURING THE FISH ATTRACTANT

[75] Inventors: William D. Bethshears, Bruceton, Tenn.; James M. Bilbrey, Dayton; Donald D. Emrick, Kettering, both of Ohio

[73] Assignee: Flow-Rite of Tennessee, Inc., Bruceton, Tenn.

[21] Appl. No.: 25,821

[22] Filed: Mar. 3, 1993

Related U.S. Application Data

[63] Continuation of Ser. No. 740,707, Aug. 6, 1991, abandoned.

[51] Int. Cl.⁶ .............................................. A01N 25/22
[52] U.S. Cl. ......................................... 424/410; 424/84; 43/42.06; 43/42.31
[58] Field of Search ......................... 427/84, 44, 410; 43/42.06, 42.31

[56] References Cited

U.S. PATENT DOCUMENTS

| | | | |
|---|---|---|---|
| 543,601 | 7/1895 | Kerfoot | 424/44 |
| 2,207,425 | 7/1940 | Arbogast | 43/42.31 |
| 2,631,937 | 3/1953 | Buss | 426/1 |
| 2,932,572 | 4/1960 | Sarich | 426/1 |
| 4,704,286 | 11/1987 | Rittschof et al. | 426/1 |
| 4,818,518 | 4/1989 | Gioffre et al. | 424/44 |
| 4,828,829 | 5/1989 | Bethshears et al. | 424/84 |
| 4,927,643 | 5/1990 | D'Orazio et al. | 426/1 |
| 5,089,277 | 2/1992 | Prochnow | 426/1 |

OTHER PUBLICATIONS

PDR (Physicians Desk Reference, p. 1395—Alk-a-Seltzer efferavescent.

*Primary Examiner*—Thurman K. Page
*Assistant Examiner*—Neil Levy
*Attorney, Agent, or Firm*—Niro, Scavone, Haller & Niro

[57] ABSTRACT

An effervescent liquid fish attractant that appeals to all of the senses of fish is disclosed. The fish attractant comprises an oil carrier liquid, scent or taste components, pigment components, light reflective particles, and $CO_2$ gas-generating particles. The novel $CO_2$ gas-generating particles comprise a weak organic acid and a base reagent, stabilized by a matrix forming polymer, such as polyvinylpyrrolidone. A novel process for preparing the $CO_2$ gas-generating particles in a $C_1$ to $C_4$ alcohol solvent is also disclosed.

17 Claims, No Drawings

EFFERVESCENT LIQUID FISH ATTRACTANT COMPOSITION WITH AUDIBLE, VISUAL, SCENT AND TASTE ENHANCEMENTS AND METHOD OF MANUFACTURING THE FISH ATTRACTANT

This is a continuation of application Ser. No. 07/740707, filed Aug. 6, 1992, abandoned.

BACKGROUND OF THE INVENTION

1. Field Of The Invention

This invention relates to liquid fish attractant compositions that can be applied to a live bait or artificial lure to enhance its appeal to fish. More specifically, this invention comprises a novel effervescent liquid fish attractant composition that enhances the appeal of a bait or lure to all of the known, important senses of fish: the visual, olfactory, auditory, taste and lateral line senses. A novel method of manufacturing the $CO_2$ gas-generating particles used in such a fish attractant is also disclosed and claimed.

2. Description Of The Prior Art

A variety of oil and water based liquid fish attractants have been used to enhance the attractiveness of live baits and artificial lures. Most such compositions appeal primarily to the olfactory and taste senses of fish. They typically consist of essential oils carrying the flavors and/or scents of prey species, or fragrances used to mask human taste transmitted by manual contact with the bait or lure. The taste or scent compounds disperse from the bait or lure when it is immersed in the water.

Solid fish attractants in tablet or powder form, including scent or taste attracting materials, also are known. Dutch Patent No. 62,063 (van Erkel), for example, discloses a solid fish attractant composition comprising tartaric acid, sodium bicarbonate, talcum, paraffin oil, bran and a trace of fennel oil. Placed in water in tablet form, or in a porous tube, the composition liberates $CO_2$ gas bubbles to puzzle and attract fish. But, the use of a solid talcum base, rather than a liquid base, prevents application of such fish attractants directly to any lure or live bait—some special provision, such as a porous holding compartment, must be provided in an artificial lure in order to use such fish attractants.

More sophisticated fish attractants also enhance the appeal of the lure to the visual sense of fish. For example, U.S. Pat. No. 4,828,829 (Bethshears) discloses a liquid fish attractant composition comprising an oil based liquid mixed with a scent, taste or pigment component, in which small, light reflective particles are dispersed. When a bait or lure to which such an attractant has been applied is immersed in water, the particles furnish a visual discharge appearance, as they disperse from the bait or lure, which resembles floating scales from an injured prey fish. The particles also aid in controlling the dispersion of scent, taste or pigment components, retaining them in the strike zone near the lure for a longer time than in the case of liquid fish attractants that lack a solid particulate component. In turn, the oil component coats the particles, imparting controlled buoyancy which slows the movement of the particles out of the strike zone. Such fish attractants appeal to the olfactory, visual, and taste senses of fish.

SUMMARY OF THE INVENTION

In addition to sight, smell and taste, fish also possess auditory and lateral line senses. The auditory sense of fish is particularly important because sound travels much further in water than in air. It also travels about five times faster than in air. The sense of hearing of some fish is so sensitive that it can detect the sound of a worm wriggling on the bottom of a lake or stream.

The lateral line sense detects motion close to the fish by sensing compression waves in the surrounding water. Using fine hairs, called neuromasts, that are situated in recesses in and between the fish scales, the neurons of the lateral line can respond to pressure waves created by sound and motion-induced turbulence near the fish. The lateral line is especially sensitive to low frequency (below 200 Hz) disturbances in the water, and is sometimes described as a "sense of distant touch," having a maximum effective range of about 10 to 20 feet. At close ranges of two to five feet or so, the lateral line sense is so directional that it allows a fish to strike at a sound source without using its vision at all.

Despite the importance of hearing and lateral line senses, in addition to vision, taste and smell, in fish feeding behavior, no liquid fish attractant has been made to appeal to all of the known senses of fish together. Our invention provides such a liquid fish attractant composition suitable for application to any live bait or artificial lure. Its preferred embodiment comprises an oil carrier liquid; one or more liquid scent or taste components; pigment or dye components; a plurality of $CO_2$ gas-generating particles, and a plurality of iridescent, metallic-colored light reflective particles.

In its most basic embodiment, our invention appeals primarily to the hearing and lateral line senses. It comprises an oil-based carrier liquid in which $CO_2$ gas-generating particles are suspended. The oil-based carrier liquid facilitates adherence of the $CO_2$ gas-generating particles to the bait or lure. Inert in the oil-based carrier liquid, the gas-generating particles begin to emit gas when immersed in water.

More specifically, when our liquid fish attractant composition is applied to a bait or lure and immersed in water, the $CO_2$ gas-generating particles liberate carbon dioxide gas, creating noises clearly audible through the water. The associated turbulence creates pressure waves that also can be sensed by the lateral line. The sound and turbulence seems to the fish to emanate from the bait or lure. The rising bubbles of $CO_2$ also stimulate the visual sense of fish. The bubbles resemble air and other gases released from dead or dying prey species, further encouraging feeding behavior.

In the preferred embodiment of our invention, simultaneously with the generation of $CO_2$ gas, the iridescent, metallic-colored light reflective particles disperse away from the bait or lure, providing a visual appearance similar to scales drifting away from an injured prey fish. The light reflective particles also aid in the dispersion of scent and taste components through the water near the lure.

The combined effect of these phenomena appeals to all of the known senses of nearby fish. The rising $CO_2$ bubbles, the dye or pigment and the floating iridescent, metallic-colored light reflective particles appeal to the visual sense; the scent and taste components, retained in the strike zone by the metallic-colored light reflective particles, attract fish through the olfactory and taste senses; the sound and turbulence generated by liberation of $CO_2$ attracts fish through the sense of hearing and through the lateral line. The result is enhanced attractiveness of the bait or lure.

Accordingly, it is an object of this invention to provide an effervescent liquid fish attractant composition that appeals particularly to the hearing and lateral line senses of fish.

It is another object of this invention to provide a preferred effervescent liquid fish attractant composition that appeals to all of the known senses of fish.

It is a further object of this invention to provide $CO_2$ gas-generating particles that can be used to enhance the auditory and lateral line attractiveness of liquid fish attractant compositions.

It is a further object of this invention to provide a method of making the $CO_2$ gas-generating particles that are used in the novel liquid fish attractant composition.

DETAILED DESCRIPTION OF THE INVENTION

The preferred effervescent liquid fish attractant composition of this invention comprises an oil carrier liquid; $CO_2$ gas-generating particles; one or more liquid scent and taste components; optional pigment and/or dye components, and iridescent, metallic-colored light reflective particles. A number of choices of constituents is available in each of these categories.

The oil carrier liquid is inert (i.e., non-reactive); immiscible with water, and functions as a solvent for certain of the remaining components and as a physical carrier for the others. It forms the bulk of the liquid fish attractant composition. Typical oil carrier liquids include mineral oils, which may be aliphatic, aromatic or mixed-base; vegetable oils; animal oils including fish oils and fish-liver oils; and edible oils such as corn or soybean oil.

We have found that the oil carrier liquid also causes the $CO_2$ gas-generating particles to continue to adhere to the bait or lure after it is coated with our effervescent liquid fish attractant and placed in water. Adhesion of $CO_2$ gas-generating particles to the lure is desirable because it places the source of sound and turbulence at the lure itself—the place within the strike zone where it is desirable that the fish should strike.

The scent or taste components may include menhaden oil, salmon oil, anise oil (anethole); cod liver oil, peppermint oil, sassafras oil, crawfish oil and herring oil. Essential oils of any fish or crustacean (e.g. shrimp) can be used. Commercially available oil-based liquid fish attractants that do not contain particles also can be used as scent or taste components.

Certain scent or taste components, notably fish oils, can function as both scent or taste components and as the oil carrier liquid that forms the bulk of the liquid fish attractant composition.

Pigment or dye components can include colored, oil soluble dyes such as fluorescent yellow or Red No. 40; or insoluble pigments such as natural mica to which color has been added by vacuum deposition. An example of this type of pigment is Dichrona GY, manufactured by EM Industries, Inc., of Hawthorne, N.Y. Dichrona GY comprises flecks of mica to which artificial color has been applied by vacuum deposition, creating a metallic sheen as a result of interference patterns on the surface of the particles. Pigment or dye constituents can be incorporated directly into the oil carrier liquid, or into the $CO_2$ gas-generating particles, or both.

Carbon dioxide gas-generating particles comprise mixtures of an acid reagent (typically a weak organic acid such as citric, maleic, tartaric or benzoic acid); an alkali metal bicarbonate base reagent (typically $NaHCO_3$ or $KHCO_3$); a matrix forming polymer (typically shellac or polyvinylpyrrolidone (PVP)) that is soluble in both water and a $C_1$ to $C_4$ alcohol; and, if desired, an optional alkali metal carbonate or $CaCO_3$ used as a reaction rate modifier or enhancer (typically $K_2CO_3$ or $CaCO_3$ is used). A pigment component such as Dichrona GY optionally may be incorporated into the $CO_2$ gas-generating particles.

The speed at which the $CO_2$ gas-generating particles release $CO_2$ when immersed in water can be varied by changing the molecular weight of the matrix-forming polymer and by altering the concentration of the optional alkali metal carbonate or $CaCO_3$ that serves as a reaction rate modifier. Increasing the molecular weight of the matrix forming polymer slows the rate of $CO_2$ gas generation. In that way, fish attractant compositions can be tailored to the appropriate depth of lure and fishing technique for various fish species—for example, a composition suitable for deep lures trolled on a downrigger should effervesce more slowly than one suitable for shallow lures in which the lure remains in the water for only a short time.

The preferred particle size range for the $CO_2$ gas-generating particles is $-16 +48$ mesh (Tyler), or about 300 to 1000 micron. The intensity of sound increases with increasing particle size; below 48 mesh (300 micron), the sound is generally too soft to be effective. Above 16 mesh (1000 micron), the particles may clog flip-top dispensing nozzles, and the adherence of such large particles to the bait or lure is much less pronounced. A broad particle size distribution within the $-16 +48$ mesh range is also desirable, because the frequency of the sound also varies with particle size, and a multiple frequency sound source is more lifelike.

Since the acid and base reagents used in the $CO_2$ gas-generating particles will react with each other if their constituent ions are dissociated at the same time, in order to prepare stable $CO_2$ gas-generating particles it is necessary to create an intimate physical mixture of the acid and base reagents without dissociating their constituent ions in any solvent in which both reagents are soluble until the fish attractant composition is placed in water. We have invented a novel process to accomplish that result. The $CO_2$ gas-generating particles are made by first dissolving the matrix forming polymer and a weak organic acid reagent such as citric, maleic, tartaric or benzoic acid (the acid reagent) in a $C_1$ to $C_4$ alcohol (the solvent); then optionally adding an alkali metal carbonate or $CaCO_3$ which will function as a reaction rate modifier, together with an alkali metal bicarbonate that serves as the basic reagent. Since alkali metal bicarbonates and alkali metal carbonates and $CaCO_3$ are insoluble in alcohols, they do not dissociate and therefore do not react with the weak organic acid. Instead, they form a suspension in the solution. Being soluble in alcohols, the weak organic acid in solution permeates the suspended alkali metal bicarbonate and optional carbonate, resulting in a very intimate physical mixture, without reaction. The matrix forming polymer must be soluble in both water and $C_1$ to $C_4$ alcohol. Its purpose is to bind the acid/base mixture together with the reaction rate modifier into a solid matrix that can be ground to the size desired for incorporation into the final fish attractant composition. While dissolved in alcohol, the matrix forming polymer does not interfere with intimate mixing of the acid and base reagents without reaction; when the matrix forming polymer dries it encapsulates and stabilizes the acid/base mixture, and when the matrix-forming polymer ultimately dissolves in water it gradually releases the acid and base reagents to react with each other to form $CO_2$ and to create turbulence and sound waves that can be heard by fish, and that can be sensed by their lateral lines.

The alcohol solution of matrix forming polymer and acid reagent, in which the base reagent and the optional alkali metal carbonate or $CaCO_3$ reaction rate modifier are suspended, may be dried in open air, in a vacuum chamber or in a vacuum oven to remove the solvent, producing solvent-free $CO_2$ gas-generating particles. Those particles are ground and sieved to the desired size, and then mixed with the oil base, the liquid scent or taste components, any dye or pigment component and the iridescent, metallic-colored light reflective particles (if desired) to make the final liquid fish attractant composition. Alternatively, the dye or pigment may be incorporated directly into the $CO_2$ gas-generating particles. $CO_2$ gas-generating particles that are too fine to be used in the effervescent liquid fish attractant are recovered by being re-dissolved in the alcohol solvent.

The following ranges of constituents of the $CO_2$ gas-generating particles may be used (solvent free weight percentages):

Matrix forming polymer 5–30
Acid reagent 20–50
Reaction rate modifier (optional) 10–40
Base reagent 15–40
Pigment (optional) 0.1–5

Between 50 and 150 grams of solvent per gram of solvent-free $CO_2$ gas-generating particles may be used in preparation.

In the preferred embodiment of the $CO_2$ gas-generating particles of this invention, the following approximate weight percentages (solvent-free basis) and specific chemicals are used:

| Matrix forming polymer (PVP of K30 grade) | 14.6 |
| Acid reagent (citric acid) | 33.5 |
| Reaction rate modifier ($K_2CO_3$) | 20.9 |
| Base reagent ($NaHCO_3$) | 29.3 |
| Pigment (Dichrona GY) | 1.7 |
| Total | 100.0 |

Polyvinylpyrrolidone of K30 molecular weight grade has a molecular weight of about 40,000. PVP molecular weight grades up to K90 (molecular weight of approximately 360,000) also may be used, depending upon the speed of reaction desired.

The preferred embodiment of the $CO_2$ gas-generating particles is prepared using about 84 grams of methanol as a solvent per 100 grams of solvent-free $CO_2$ gas-generating particles.

The iridescent, metallic-colored light reflective particles may be made from coated aluminum foil or polyester or other thermoplastic resin materials. The particles need not contain metal to be iridescent and metallic-colored; a metallic sheen can be produced by specular reflection from interference patterns on the surface of a plastic particle, for example. One example of suitable particles is non-tarnishing gold, red or silver iridescent metallic colored particles sold by Meadowbrook Inventions, Inc. under the trade name Micronic Jewels, as described in U.S. Pat. No. 4,828,829 (Bethshears). That description is incorporated by reference herein. Those particles comprise polyester or aluminum foils or films which are precision cut into small particles. They can be readily dispersed in the fish attractant compositions of our invention. The preferred particle size is between −65 +270 mesh, or about 50 to 200 micron. A range of −65 +100 mesh, or about 150 to 200 micron, is most preferred.

Even after the bait or lure is immersed in water, the iridescent, metallic-colored light reflective particles remain coated with oil carrier liquid, in which scent and taste components are dissolved. Thus, the iridescent, metallic-colored light reflective particles act as carriers, improving the spreading of those components through the water near the bait or lure. The iridescent, metallic-colored light reflective particles are typically denser than water, while the oil carrier liquid is less dense than water. Therefore, the oil carrier liquid-coated particles are more nearly neutrally buoyant than uncoated particles, so they remain in the strike zone near the lure for a longer time than uncoated particles.

In the preferred embodiment of the liquid fish attractant composition of our invention, the following approximate amounts of constituents are used, expressed in volume percentages on a finished basis:

| Oil carrier liquid | 70–98 |
| Scent or taste components | 1–8 |
| Pigment components | 0.1–5 |
| $CO_2$ gas-generating particles | 1–25 |
| Iridescent, metallic-colored light reflective particles | 0.01–1 |

The pigment components may be incorporated into the finished product, or into the $CO_2$ gas-generating particles at the time of their manufacture, or both.

Those of ordinary skill in the art will recognize that changes and modifications can be made to the foregoing specific embodiments of our invention without departing from its spirit and scope. We intend, therefore, to cover such changes and modifications by the following claims.

We claim:

1. A liquid composition suitable for application to a bait or lure, consisting essentially of:
   a. about 70 to 98 volume percent of oil carrier liquid including at least one of a mineral oil, vegetable oil, fish oil, fish-liver oil and edible oil;
   b. about 1 to 8 volume percent of scent or taste components including at least one of a menhaden oil, salmon oil, anethole, cod liver oil, herring oil, peppermint oil, sassafras oil and crawfish oil;
   c. about 1 to 25 volume percent of $CO_2$ gas-generating particles having a size range of about −16 +48 mesh which are inert in said oil carrier and reactive in an aqueous solution; and
   d. about 0.01 to 1 volume percent of iridescent, metallic-colored light reflective particles;
   wherein said liquid composition functions as an effervescent liquid fish attractant to stimulate fish to strike at said bait or lure.

2. The effervescent liquid fish attractant composition of claim 1, wherein said iridescent, metallic-colored light reflective particles have a particle size range of about −65 +100 mesh.

3. The effervescent liquid fish attractant composition of claim 1, further consisting essentially of about 1 to 8 volume percent of dye or pigment components.

4. The effervescent liquid fish attractant composition of claim 1, wherein said $CO_2$ gas-generating particles further consist essentially of a mixture of a weak organic acid reagent; an alkali metal bicarbonate base reagent and a matrix forming polymer.

5. The effervescent liquid fish attractant composition of claim 4, wherein said $CO_2$ gas-generating particles further consist essentially of a reaction rate modifier selected from the group consisting of alkali metal carbonates and $CaCO_3$.

6. The effervescent liquid fish attractant composition of claim 4, wherein said $CO_2$ gas-generating particles further consist essentially of a plurality of flecks of mica.

7. The effervescent liquid fish attractant composition of claim 4, wherein said matrix forming polymer is soluble in both water and $C_1$ to $C_4$ alcohol.

8. The effervescent liquid fish attractant composition of claim 4, wherein said matrix forming polymer is polyvinylpyrrolidone.

9. The effervescent liquid fish attractant composition of claim 4, wherein said weak organic acid is selected from the group consisting of citric, maleic, tartaric and benzoic acids.

10. The effervescent liquid fish attractant composition of claim 4, wherein said alkali metal bicarbonate base reagent is selected from the group consisting of sodium and potassium bicarbonates.

11. The effervescent liquid fish attractant composition of claim 1, wherein said $CO_2$ gas-generating particles further consist essentially of a mixture of the following constituents:
   a. about 5 to 30 weight percent of matrix forming polymer;
   b. about 20 to 50 weight percent of acid reagent;
   c. about 10 to 40 weight percent of reaction rate modifier;
   d. about 15 to 40 weight percent of base reagent; and
   e. about 0.1 to 5 weight percent of pigment or dye composition.

12. The effervescent liquid fish attractant composition of claim 1, wherein said $CO_2$ gas-generating particles further consist essentially of a mixture of the following constituents:
   a. about 14.6 weight percent of PVP having a molecular weight of approximately 40,000;
   b. about 33.5 weight percent of citric acid;
   c. about 20.9 weight percent of $K_2CO_3$;
   d. about 29.3 weight percent of $NaHCO_3$, and
   e. about 1.7 weight percent of mica flecks.

13. The effervescent liquid fish attractant composition of claim 12, wherein said $CO_2$ gas-generating particles have a size range of about $-16 +48$ mesh.

14. A liquid composition suitable for application to a bait or lure, comprising:
   a. about 70 to 98 volume percent of oil carrier liquid, including at least one of mineral oil, vegetable oil, fish oil, fish-liver oil and edible oil;
   b. about 1 to 8 volume percent of scent or taste components, including at least one of menhaden oil, salmon oil, anethole, cod liver oil, herring oil, peppermint oil, sassafras oil and crawfish oil;
   c. about 1 to 25 volume percent of $CO_2$ gas-generating particles having a particle size range of about $-16 +48$ mesh, said $CO_2$ gas-generating particles further comprising:
      (1) about 14.6 weight percent of PVP having a molecular weight of approximately 40,000;
      (2) about 33.5 weight percent of citric acid;
      (3) about 20.9 weight percent of $K_2CO_3$;
      (4) about 29.3 weight percent of $NaHCO_3$, and
      (5) about 1.7 weight percent of Dichrona GY;
   d. about 0.01 to 1 volume percent of iridescent, metallic-colored light reflective particles having a particle size range of about $-65 +100$ mesh, and
   e. about 1 to 8 volume percent of dye or pigment components;

wherein said liquid composition functions as an effervescent liquid fish attractant to stimulate fish to strike at said bait or lure.

15. An effervescent liquid fish attractant composition comprising:
   a. about 70 to 98 volume percent of mineral oil;
   b. about 1 to 8 volume percent of anethole; and
   c. about 1 to 25 volume percent of $CO_2$ gas-generating particles having a size range of about $-16 +48$ mesh which are inert in said oil carrier and reactive in an aqueous solution wherein said particles further comprise a mixture of the following constituents:
      i. about 14.6 weight percent of PVP having a molecular weight of approximately 40,000;
      ii. about 33.5 weight percent of citric acid;
      iii. about 20.9 weight percent of $K_2CO_3$;
      iv. about 29.3 weight percent of $NaHCO_3$; and
      v. about 1.7 weight percent of mica flecks.

16. A process for fishing comprising the steps of applying to a lure an effervescent liquid fish attractant composition comprising:
   a. about 70 to 98 volume percent of oil carrier liquid including at least one of mineral oil, vegetable oil, fish oil, fish-liver oil and edible oil;
   b. about 1 to 8 volume percent of scent or taste components;
   c. about 1 to 25 volume percent of $CO_2$ gas-generating particles having a size range of about $-16 +48$ mesh which are inert in said oil carrier and reactive in an aqueous solution;
   d. about 0.01 to 1 volume percent of iridescent, metallic-colored light reflective particles;

and then using said lure to catch fish.

17. The process of claim 16 wherein said effervescent liquid fish attractant composition further comprises about 1 to 8 volume percent of dye or pigment components.

* * * * *